(12) United States Patent
Hunter

(10) Patent No.: US 6,558,445 B2
(45) Date of Patent: May 6, 2003

(54) DRY FERTILIZER COMPOSITIONS AND METHOD FOR MAKING THE SAME

(75) Inventor: Gregory S. Hunter, Kiowa, CO (US)

(73) Assignee: Luzenac America, Inc., Englewood, CO (US)

( * ) Notice: Subject to any disclaimer, the term of this patent is extended or adjusted under 35 U.S.C. 154(b) by 0 days.

(21) Appl. No.: 10/107,718

(22) Filed: Mar. 26, 2002

(65) Prior Publication Data

US 2002/0139158 A1 Oct. 3, 2002

Related U.S. Application Data

(60) Provisional application No. 60/279,806, filed on Mar. 28, 2001.

(51) Int. Cl.[7] .............................. C05B 1/00; C05C 1/00; C05D 1/00; C05D 5/00
(52) U.S. Cl. ...................... 71/35; 71/28; 71/31; 71/32; 71/61; 71/64.07; 71/64.11
(58) Field of Search ................ 71/28, 31, 32, 71/35, 61, 64.07, 64.11

(56) References Cited

U.S. PATENT DOCUMENTS

| | | | | | |
|---|---|---|---|---|---|
| 2,399,987 A | * | 4/1946 | Cordie et al. | ................. | 23/103 |
| 3,192,031 A | * | 6/1965 | Zaayenga | ....................... | 71/28 |
| 3,234,006 A | * | 2/1966 | Sawyer | ........................... | 71/59 |
| 3,295,950 A | * | 1/1967 | Blouin et al. | .................. | 71/64 |
| 4,880,455 A | * | 11/1989 | Blank | ............................. | 71/28 |
| 4,936,897 A | * | 6/1990 | Pipko et al. | ............... | 71/64.05 |
| 5,560,768 A | * | 10/1996 | Gordonov et al. | ......... | 71/64.07 |
| 5,704,962 A | * | 1/1998 | Navascues | ................. | 71/64.07 |
| 5,917,110 A | * | 6/1999 | Kust | ............................. | 71/27 |

FOREIGN PATENT DOCUMENTS

| | | | |
|---|---|---|---|
| JP | 52093561 | * | 8/1977 |
| JP | 52093561 A | | 8/1977 |
| JP | 08002988 | * | 1/1996 |
| JP | 08002988 A | | 1/1996 |
| WO | 00/76649 | * | 12/2000 |
| WO | WO 00/76649 A 1 | | 12/2000 |

* cited by examiner

*Primary Examiner*—Chhaya D. Sayala
(74) *Attorney, Agent, or Firm*—Sheridan Ross P.C.

(57) ABSTRACT

The present invention describes a composition which has as its base a dry, granular fertilizer and to which is added a flowing agent and further to which is added a hydrophobic agent. The present invention also describes methods for making this composition.

13 Claims, 2 Drawing Sheets

DRY FERTILIZER COMPOSITIONS AND METHOD FOR MAKING THE SAME

CROSS REFERENCE TO RELATED APPLICATIONS

This application claims priority from U.S. Provisional Patent Application Ser. No. 60/279,806, filed Mar. 28, 2001, the entirety of which is incorporated herein by reference.

FIELD OF THE INVENTION

This application relates generally to dry fertilizer compositions and methods for making the compositions. More specifically, the invention relates to a dry fertilizer composition having improved anti-caking and flow properties and a method for making the dry fertilizer compound.

BACKGROUND OF THE INVENTION

Dry, granular fertilizers are more extensively used because they are less expensive and easier to handle and apply than liquid fertilizers. However, because the dry, granular fertilizers tend to be hygroscopic, that is, they easily absorb moisture, the dry fertilizers will cake easily. Maintenance of a free flowing nitrogen-containing material in its manufactured form, either crystalline, granular or pellets, under long term storage conditions, has long been a problem in the art. It is usually recommended that the fertilizer should always be handled and stored in ways to avoid contact with water, humidity, or damp surfaces. Caking prevents the dry material from flowing easily. Caking also prevents the fertilizer from being handled, stored or transported easily. Caking can also cause breakage of handling, storage, or transportation apparatus. In addition, caking of the fertilizer can render the fertilizer unsuitable for its intended use.

Dry fertilizer also has the tendency to fracture into smaller particles resulting in a substantial amount of dust being created when the fertilizer is handled, transported and applied to the soil in its intended use. The presence of dust can adversely affect the workers who handle the dry fertilizer, if such dust is inhaled. Thus, safety precautions need to be taken when working with dry fertilizers that create large quantities of dust.

Many have tried to control the dust and prevent caking through the use of conditioning agents applied to the fertilizer. For example, anti-caking properties have been imparted to fertilizer particles through the individual use of lignosulfonate, tripotassium phosphate, surfactants, kaolin, zeolite, clay, calcium oxide, calcium hydroxide, cement, fly ash, magnesium nitrate, or alkyl sulfates, to name a few. Despite the long standing problem, the market has not yet developed a satisfactory solution which provides a free-flowing (anti-caking), and dust controlled dry, granular fertilizer.

SUMMARY OF THE INVENTION

The present invention describes a composition which has as its base a dry, granular fertilizer and to which is added a flowing agent and further to which is added a hydrophobic agent. The present invention also describes a method for making this composition.

The present invention exhibits significantly improved anti-caking properties over untreated fertilizers. In addition, the present invention controls dust significantly more than untreated fertilizers. Thus, it is an object of the present invention to provide a treated fertilizer that has improved anti-caking properties and significantly reduced production of dust.

These and other objects, features, and advantages of the invention will become apparent from the following best mode description, the drawings and the claims.

BRIEF DESCRIPTION OF THE DRAWINGS

The figures which follow depict the results of a preferred embodiment of the invention, and may depict various alternative embodiments. The invention is not limited to the embodiment or embodiments depicted herein since even further various alternative embodiments will be readily apparent to those skilled in the art.

DETAILED DESCRIPTION OF THE INVENTION

Figure 1:
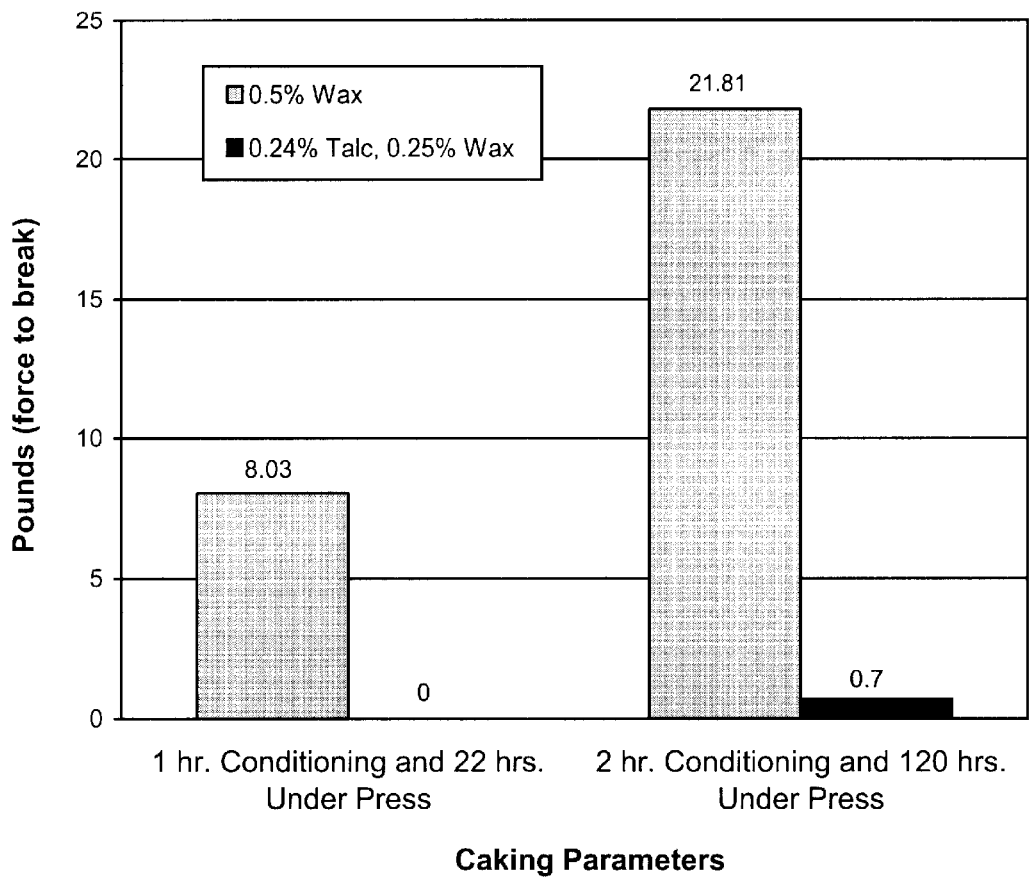
FIG. 1 depicts the results of the anti-caking testing on the control fertilizer and the fertilizer produced according to the present invention.

At the outset, it should be understood that this invention comprises a fertilizer composition containing a dry, granular fertilizer, a flowing agent, and a hydrophobic agent. The description which follows describes a preferred embodiment of the invention, and various alternative embodiments. It should be readily apparent to those skilled in the art, however, that various other alternative embodiments may be accomplished without departing from the spirit or scope of the invention.

The inventive composition described herein has as its base a dry, granular fertilizer. The fertilizer is, preferably, a nitrogen, phosphate, or potassium (or any combination of the three) based fertilizer (usually called "NPK fertilizers"). There are thousands of formulations of NPK fertilizers, all of which are suitable for use in the present invention. The fertilizer has a base component which can be either nitrogen, phosphorus, or potassium, or any combination of these elements. The fertilizer can also have a nutrient component, designed to provide additional nutrients for specific soil needs. These nutrient components include but are not limited to iron, magnesium, boron, sulfur, chloride, molybdenum, copper, manganese, calcium, tin, vanadium, iodine, rubidium, bromine, zinc, or any combination of these elements.

To the dry fertilizer, a flowing agent is added. Although varying amounts of the flowing agent can be added to the fertilizer, the amount of flowing agent added is typically below about 2 weight percent, based on the total weight of the final composition. More typically, the amount of flowing agent added is in the range of about 0.01 weight percent to about 2.0 weight percent. In other embodiments, the flowing agent is present in amounts of about 0.01 weight percent to about 1 weight percent, or in amounts of about 0.01 weight percent to about 0.5 weight percent. The flowing agent is, preferably, a finely ground mineral such as talc. The flowing agent includes but is not limited to bentonite, talc, clay, diatomaceous earth, limestone, calcium carbonate, kaolin or any combination of these.

The flowing agent is typically a dry material that is added to the fertilizer in the appropriate quantity and mixed by conventional methods known in the art. After the flowing agent is uniformly dispersed throughout the fertilizer, the composition is suitable for further processing.

To the dry fertilizer and flowing agent mixture, a hydrophobic agent is added. Although varying amounts of the hydrophobic agent can be added to the fertilizer, the amount of hydrophobic agent added is typically below about 2 weight percent. More typically, the amount of hydrophobic agent added is in the range of about 0.01 weight percent to about 2.0 weight percent. In other embodiments, the hydrophobic agent is present in amounts of about 0.01 weight percent to about 1 weight percent, or in amounts of about 0.01 weight percent to about 0.5 weight percent. The hydrophobic agent is, preferably, a wax. The hydrophobic agent includes but is not limited to paraffin, wax, liquid parting agents, any petroleum based materials, oils, soaps, amines, sulfonates, surfactants, liquid coatings or any combination of these.

The hydrophobic agent is typically added as a liquid to the mixture of the fertilizer and flowing agent. For example, the liquid hydrophobic agent can be sprayed, with conventional spraying equipment, on the fertilizer and flowing agent mixture and mixed to evenly coat the dry particles with the liquid hydrophobic agent. If the hydrophobic agent is a solid at ambient temperatures, it can be heated to its melting point, or preferably above its melting point to avoid solidification in the spraying equipment.

The methods and compositions of the present invention have been found to function well at conditions of high temperature and high humidity. For example, the compositions of the present invention retain their anti-caking and dust control properties even after storage at temperature above about 80 degrees Fahrenheit, more preferably, above about 90 degrees Fahrenheit, and, even more preferably, above about 95 degrees Fahrenheit. Further, the compositions retain their beneficial properties after storage at a relative humidity of above about 80 percent, more preferably above about 90 percent and, even more preferably, at about 100 percent.

Embodiments of the present invention also include methods of preparing fertilizer compositions by adding a talc component and then a wax component, as described herein. Other embodiments of the invention include a fertilizer composition which includes a dry, granular fertilizer, as well as a talc component and a wax component. Other methods include methods for reducing caking of fertilizer during the handling, storage and application thereof by use of the fertilizer composition of the present invention. Still other methods include methods of reducing dust production during the handling, storage and application of fertilizer by the use of fertilizer compositions of the present invention.

The following Example is provided to illustrate embodiments of the present invention and are not intended to limit the scope of the invention.

EXAMPLE 1

This example illustrates the effect of using talc and wax in dry fertilizers on caking properties and dust production.

For the following evaluations, 11-52-0 NPK monoammonium phosphate (MAP) was obtained from J. R. Simplot Company in Pocatello, ID. The wax is purchased by Simplot from the Flying "J" refinery in Salt Lake City, Utah. In order to be applied to the fertilizer, the wax was heated to above its melting temperature and sprayed onto the fertilizer granules.

Caking Evaluation

In this evaluation, the MAP fertilizer described above was treated with approximately 0.24 weight percent talc and then treated with 0.25 weight percent wax. 90 grams of the treated fertilizer was placed in an environmental chamber at 90° F. and 100% relative humidity for various time periods. After conditioning in the environmental chamber, the treated fertilizer samples were placed in stainless steel cylinders (5.4 in$^3$) with a stainless steel plunger inserted into each cylinder and over the sample. The cylinders were then placed under a press with 440 pounds of pressure applied to the plunger. After a set time period, the force (pounds) needed to break the formed cake was measured. Each measurement was repeated at least 4 times for each composition and each time period.

The results of this evaluation are shown in the attached FIG. 1. As is obvious from the results shown in FIG. 1, the fertilizer produced according to the present invention required much less force to break apart both at 1 hour of exposure to the chamber and at 2 hours of exposure to the chamber, thus evidencing the anti-caking properties of the fertilizer composition.

Dust Evaluation

In this evaluation, the MAP was again treated with approximately 0.24 weight percent talc and then treated with 0.25 weight percent wax. 100 grams of each sample of MAP was sieved on a vibratory gyro-shaker through a 35-mesh screen for 5 minutes. After 5 minutes the dust generated through the screen was weighed, and % dust created by the sieving action of the fertilizer was calculated.

Figure 2:
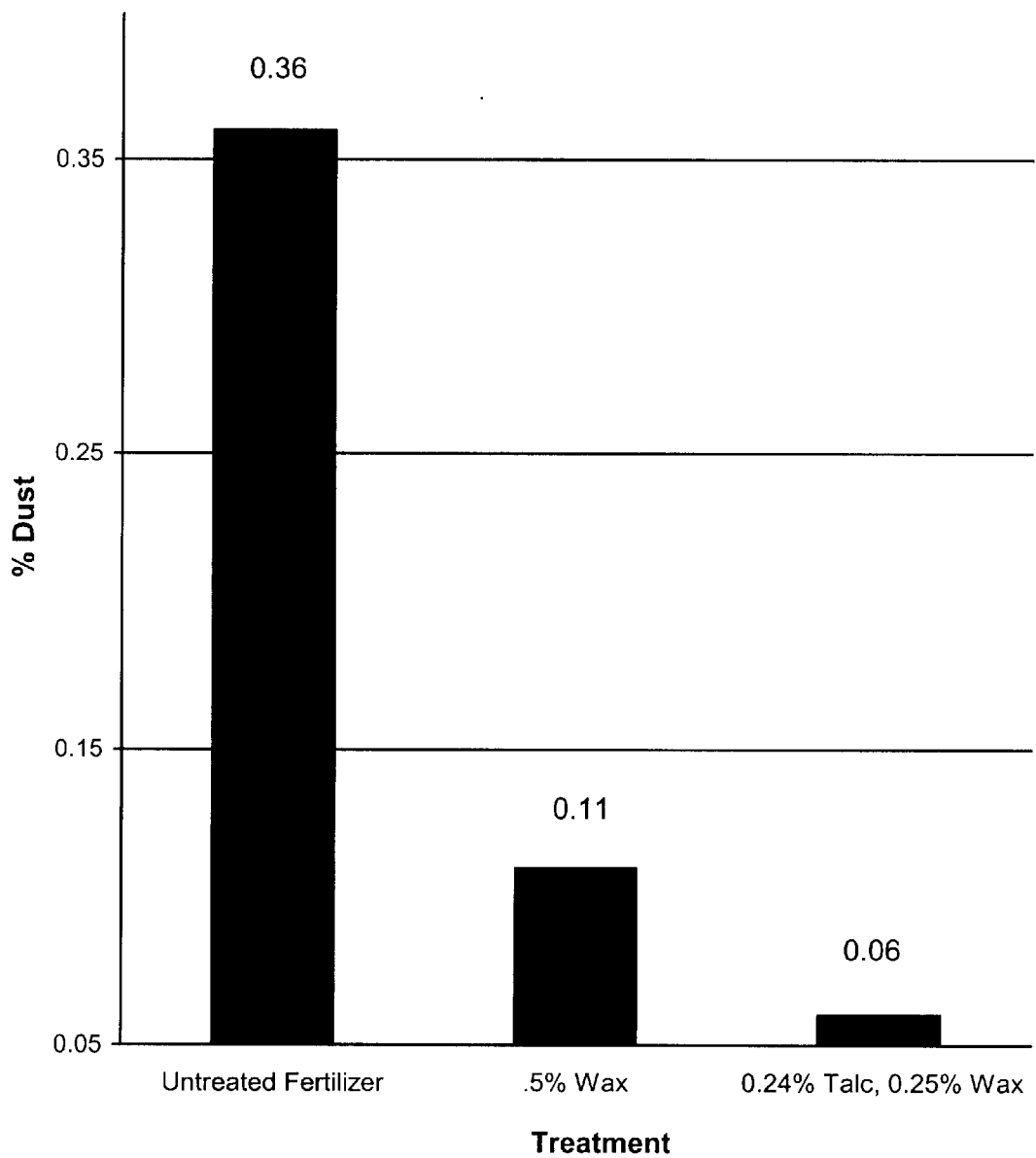
FIG. 2 depicts the results of the dust control testing on the control fertilizer and the fertilizer produced according to the present invention.

The results of this evaluation are shown in the attached FIG. 2. FIG. 2 shows that the fertilizer produced according to the present invention produces a significantly smaller percent of dust than both the untreated fertilizer and the fertilizer treated only with wax.

The results indicate that a flowing agent such as talc can be added to the fertilizer granules followed by the addition of a hydrophobic agent such as wax to achieve superior anti-caking and dust control compared to treatments that utilize only wax as the additive. Moreover, the amount of hydrophobic agent can also be lowered compared to conventional use of a hydrophobic agent alone and still have the improved properties described herein. This can benefit the fertilizer manufacturer and its customer with improved product handling and improved product quality.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

I claim:

1. A method of making an improved fertilizer, comprising the sequential steps of:
   a) providing a dry fertilizer, said fertilizer comprising a base component selected from the group consisting of nitrogen, phosphorus, potassium and combinations thereof;
   b) adding a flowing agent to the fertilizer, wherein said flowing agent is selected from the group consisting of talc, limestone, calcium carbonate, kaolin and combinations thereof;
   c) mixing the flowing agent with the fertilizer; and, d) adding a liquid hydrophobic agent to the fertilizer and flowing agent, wherein said hydrophobic agent is selected from the group consisting of wax, paraffin, petroleum based compositions, oils, soaps, amines, sulfonates, surfactants, and combinations thereof wherein the improved fertilizer exhibits anti-caking properties and dust control properties.

2. The method of making an improved fertilizer according to claim 1 wherein an amount of flowing agent added to the fertilizer is from about 0.01 weight percent to about 2.0 weight percent.

3. The method of making an improved fertilizer according to claim 1 wherein an amount of wax added to the fertilizer and flowing agent is from about 0.01 weight percent to about 2.0 weight percent.

4. The method of making an improved fertilizer according to claim 1 wherein the fertilizer also comprises a nutrient component.

5. The method of making an improved fertilizer according to claim 4 wherein the nutrient component of the fertilizer is selected from a group consisting of iron, magnesium, boron, sulfur, chloride, molybdenum, copper, manganese, calcium, tin, vanadium, iodine, rubidium, bromine, zinc, and combinations thereof.

6. The method of making an improved fertilizer according to claim 1 wherein the flowing agent is talc and the hydrophobic agent is wax.

7. A product made by the process comprising the sequential steps of:

a) providing a dry fertilizer, said fertilizer comprising a base component selected from the group consisting of nitrogen, phosphorus, potassium and combinations thereof;

b) adding a flowing agent to the fertilizer, wherein said flowing agent is selected from the group consisting of talc, limestone, calcium carbonate, kaolin and combinations thereof;

c) mixing the flowing agent with the fertilizer; and, d) adding a liquid hydrophobic agent to the fertilizer and flowing agent, wherein said hydrophobic agent is selected from the group consisting of wax, paraffin, petroleum based compositions, oils, soaps, amines, sulfonates, surfactants, and combinations thereof wherein the improved fertilizer exhibits anti-caking properties and dust control properties.

8. An improved fertilizer composition, comprising:

a mixture of dry fertilizer comprising a base component selected from the group consisting of nitrogen, phosphate, potassium and combinations thereof;

and a flowing agent selected from the group consisting of talc, limestone, calcium carbonate, kaolin and combinations thereof;

wherein said mixture of dry fertilizer and flowing agent is coated with a liquid hydrophobic agent selected from the group consisting of wax, paraffin, petroleum based compositions, oils, soaps, amines, sulfonates, surfactants, and combinations thereof; and, wherein the composition exhibits anti-caking properties and dust control properties.

9. An improved fertilizer composition according to claim 8, wherein an amount of the flowing agent is from about 0.01 weight percent to about 2.0 weight percent.

10. An improved fertilizer composition according to claim 9, wherein an amount of the hydrophobic agent is from about 0.01 weight percent to about 2.0 weight percent.

11. An improved fertilizer composition according to claim 8, wherein the fertilizer also comprises a nutrient component.

12. An improved fertilizer composition according to claim 8, wherein the nutrient component of the fertilizer is selected from a group consisting of iron, magnesium, boron, sulfur, chloride, molybdenum, copper, manganese, calcium, tin, vanadium, iodine, rubidium, bromine, zinc, and combinations thereof.

13. An improved fertilizer composition according to claim 8, wherein the flowing agent is talc and the hydrophobic agent is wax.

* * * * *